United States Patent
Zhang et al.

(10) Patent No.: US 11,382,314 B2
(45) Date of Patent: Jul. 12, 2022

(54) MOBILE QUANTITATIVE FEEDING-SPRAYING INTEGRATED SYSTEM AND METHOD FOR AQUACULTURE

(71) Applicant: Shanghai Ocean University, Shanghai (CN)

(72) Inventors: Lizhen Zhang, Shanghai (CN); Shanhan Liu, Shanghai (CN); Jiemin Ye, Shanghai (CN); Di Wu, Shanghai (CN); Leilei Chen, Shanghai (CN)

(73) Assignee: Shanghai Ocean University, Shanghai (CN)

( * ) Notice: Subject to any disclaimer, the term of this patent is extended or adjusted under 35 U.S.C. 154(b) by 0 days.

(21) Appl. No.: 17/510,963

(22) Filed: Oct. 26, 2021

(65) Prior Publication Data

US 2022/0079123 A1    Mar. 17, 2022

(30) Foreign Application Priority Data

Oct. 26, 2020   (CN) .......................... 202011155614.9

(51) Int. Cl.
| | |
|---|---|
| *A01K 61/10* | (2017.01) |
| *A01K 61/60* | (2017.01) |
| *A01K 61/80* | (2017.01) |
| *A01K 61/85* | (2017.01) |
| *A01K 61/13* | (2017.01) |

(52) U.S. Cl.
CPC .............. *A01K 61/85* (2017.01); *A01K 61/10* (2017.01); *A01K 61/13* (2017.01); *A01K 61/60* (2017.01); *A01K 61/80* (2017.01)

(58) Field of Classification Search
CPC ........ A01K 61/10; A01K 61/13; A01K 61/60; A01K 61/80
USPC .......................................... 119/215, 223, 230
See application file for complete search history.

(56) References Cited

U.S. PATENT DOCUMENTS

| | | | | |
|---|---|---|---|---|
| 5,133,287 | A * | 7/1992 | Hicks ..................... | A01K 61/80 119/230 |
| 8,825,241 | B2 * | 9/2014 | Hine ..................... | G05D 1/0206 701/2 |
| 8,955,457 | B2 * | 2/2015 | Chen ..................... | A01K 61/80 119/230 |

FOREIGN PATENT DOCUMENTS

| | | |
|---|---|---|
| CN | 201873100 U | 6/2011 |
| CN | 204499116 U | 7/2015 |
| CN | 105475206 A | 4/2016 |
| CN | 105475968 A | 4/2016 |
| CN | 206324024 U | 7/2017 |
| CN | 206782405 U | 12/2017 |

(Continued)

*Primary Examiner* — David J Parsley

(57) ABSTRACT

A mobile quantitative feeding-spraying integrated system and method. The system includes at least one hull equipped with a propeller, a feeder housing fixedly arranged on the hull, a feed box arranged on the feeder housing, a flip assembly provided at an upper end of the feed box, a blanking device arranged in the feeder housing to quantitatively control the bait blanking amount, a casting device and a spraying device. An upper end of the blanking device is a feeding end, which supports and is connected to the lower end of the feed box. A lower end of the blanking device is the discharging end. An upper side of the casting device is connected with the lower end of the blanking device, and the lower side of the casting device is provided with a discharging end facing the aquaculture water body.

7 Claims, 7 Drawing Sheets

(56) References Cited

FOREIGN PATENT DOCUMENTS

| CN | 208064239 U | 11/2018 |
| CN | 209345834 U | 9/2019 |
| CN | 210610713 U | 5/2020 |
| KR | 20050018839 A | 2/2005 |
| WO | 2016023071 A1 | 2/2016 |

\* cited by examiner

MOBILE QUANTITATIVE FEEDING-SPRAYING INTEGRATED SYSTEM AND METHOD FOR AQUACULTURE

CROSS-REFERENCE TO RELATED APPLICATION

This application claims the benefit of priority from Chinese Patent Application No. 202011155614.9, filed on October 26. The content of the aforementioned application, including any intervening amendments thereto, is incorporated herein by reference in its entirety.

TECHNICAL FIELD

This application relates to aquaculture techniques, in particular to a mobile quantitative feeding-spraying integrated system and method for aquaculture.

BACKGROUND

In recent years, the aquaculture industry has made great progress in China. Feed is an important input in the aquaculture production. Reasonable feeding strategy can effectively save feed and reduce aquaculture costs, and can reduce the pollution of the excessive bait to the water environment and the disease occurrence. In order to further lower the occurrence of diseases, regular spraying is necessary.

In the existing mobile bait-feeding boats, a feed box of the bait-feeding machine is generally equipped with a cover. When the bait-feeding boat is docked for replenishment, the cover of the feed box needs to be removed manually, and then placed on the box after the replenishment is completed, so that it fails to achieve the matching with the automatic feeding device, resulting in inconvenient operation. Therefore, it is often necessary to automatically control the opening and closing of the box. Moreover, the commercially available bait-feeding machines can only feed dry feed, and cannot provide wet feed. Speaking from experience, the feed moisturized with water is more beneficial to the intake of shrimps compared with the dry feed. The existing quantitative bait-feeding technologies mainly include screw conveying type, rotary table quantitative type and sliding quantitative box type. Among them, the screw conveying device fails to transport highly-viscous materials, and has high crushing rate and serious wear. The rotary table quantitative and sliding quantitative box methods cannot be used for continuous feeding and are not suitable for larger bait-feeding machines. In addition to the daily feeding tasks, it also needs to perform regular spraying. At present, the spraying is still mainly performed manually, leading to high labor intensity and low efficiency. There is a lack of commercially-available spraying equipment, let alone an automatic quantitative feeding-spraying integrated system.

SUMMARY

An object of this application is to provide a mobile quantitative feeding-spraying integrated system and method for aquaculture to realize the integrated and automatic operation of quantitative bait feeding and spraying.

Technical solutions of this application are described as follows.

In a first aspect, this application provides a mobile quantitative feeding-spraying integrated system for aquaculture, comprising:
at least one hull equipped with a propeller;
a feeder;
a feeder housing; and
a spraying device;
wherein the feeder housing is fixedly arranged on the at least one hull;
the feeder comprises a feed box, a flip assembly, a blanking device and a casting device;
the feed box is arranged above the feeder housing, and is configured for holding a bait;
the flip assembly is provided at an upper end of the feed box, and is configured to be automatically started and stopped;
the blanking device is configured to quantitatively control a blanking amount of the bait dropping, and is provided in the feeder housing; an upper end of the blanking device is a feeding end, which is configured to support and communicate with a lower end of the feed box; a lower end of the blanking device is a discharging end;
the casting device is configured to cast the bait; an upper side of the casting device is communicated with the lower end of the blanking device, and a lower side of the casting device is provided with a discharging port toward an aquaculture water body;
the spraying device is arranged in the feeder housing, and is provided with a spray end extending out of the feeder housing; and
the flip assembly, the blanking device, the casting device and the spraying device are controlled by a remote control terminal.

In a second aspect, this application provides a mobile quantitative feeding-spraying integrated method, comprising:
quantitatively feeding a bait and spraying an aquaculture drug simultaneously or separately; and
replenishing the bait and the aquaculture drug simultaneously or separately.

Compared to the prior art, this application has the following beneficial effects.

During the bait feeding process, the quantitative blanking device enables that each time the amount of the bait fed to the casting device is kept the same, and then the bait can be sprinkled into the aquaculture water body to achieve the quantitative feeding. Moreover, a spraying device is provided to spray aquaculture drug into the aquaculture water body. The system provided herein integrates a quantitative blanking device, a casting device, and a spraying device, and thus can realize the integrated and automatic operation of quantitative feeding and spraying, significantly improving the efficiency of feeding and spraying, enhancing the automation level of aquaculture, and reducing the labor intensity.

Figure 1:
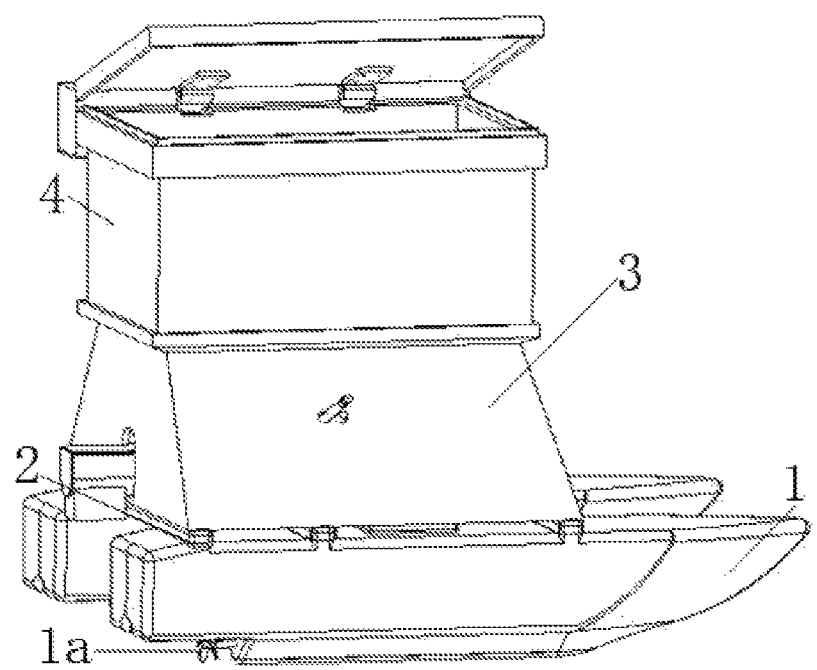
FIG. 1 shows a general assembly of a mobile quantitative feeding-spraying integrated system according to an embodiment of the present disclosure.

In the drawings: 1, hull; 1a, propeller; 2, connecting rod; 3, feeder housing; 3a, buckle; 3b, fixing base; 3c, first hole; 3d, positioning groove; 3e, second hole; 3f, third hole; 4, feed box; 4a, hook piece; 4b, bottom connecting plate; 5, flip assembly; 501, stepping motor; 502, drive gear; 503, driven gear; 504, connector; 505, rotating shaft; 506, feed box cover; 507, stopping bar; 508, feed box cover base; 508a, insertion slot; 509, drive housing base;

6, blanking device; 601, blanking motor, 602, blanking housing base; 603, upper connecting plate; 604, lower connecting plate; 605, blanking rotating shaft, 606, blade; 607, cavity;

7, casting device; 701, feeding motor; 702, feeding housing base; 703, upper inlet; 704, water inlet pipe; 705, water pump; 706, water outlet pipe; 707, water spray nozzle; 708, lower outlet; 709, shaftless spiral blade;

8, spraying device; 801, atomizing drug-spraying nozzle; 802, spray pipe; 803, drug box cover; 804, drug-feeding pipe; 805, drug box; 806, spray pump; and 807, float valve.

DETAILED DESCRIPTION OF EMBODIMENTS

The disclosure will be further described below with reference to the accompanying drawings and embodiments.

Figure 2:
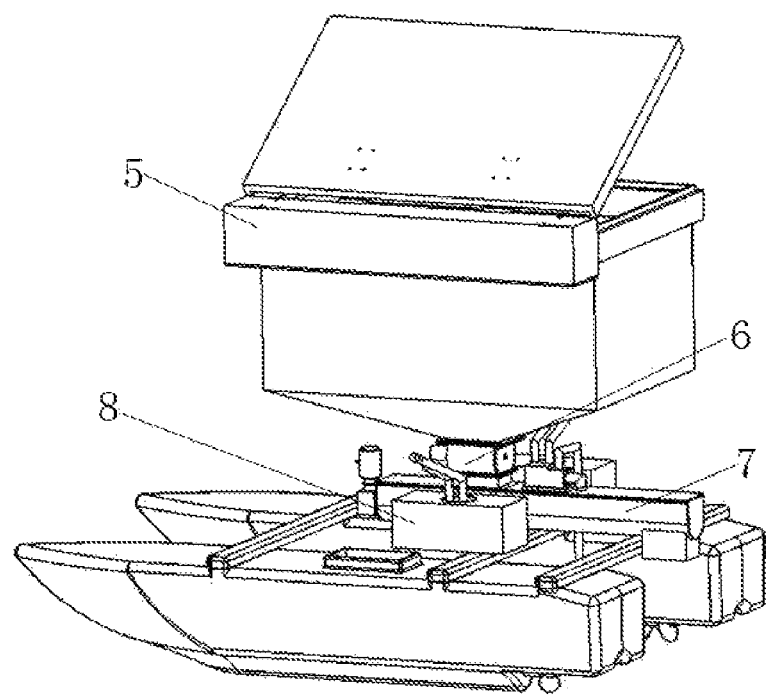
FIG. 2 is a perspective view of the mobile quantitative feeding-spraying integrated system according to an embodiment of the preset disclosure after the feeder housing is hidden.

As shown in FIGS. 1 and 2, a mobile quantitative feeding-spraying integrated system is provided, which includes two hulls 1 equipped with a propeller 1a, a feeder housing 3, a feed box 4, a flip assembly 5, a blanking device 6, a casting device 7 and a spraying device. The feeder housing 3 is fixedly arranged on the two hulls 1 through a connecting rod 2. The feed box 4 is arranged above the feeder housing 3, and is configured for holding a bait. The flip assembly 5 is provided at an upper end of the feed box 4, and is configured to be automatically opened and closed.

The blanking device 6 is configured to quantitatively control a blanking amount of the bait, and is provided in the feeder housing 3. An upper end of the blanking device 6 is a feeding end, which is configured to support and communicate with a lower end of the feed box 4. The lower end of the blanking device 6 is a discharging end.

The casting device 7 is configured to cast the bait. An upper side of the casting device 7 is communicated with the lower end of the blanking device 6. A lower side of the casting device 7 is provided with a discharging port facing an aquaculture water body.

The spraying device 8 is arranged in the feeder housing 3, and is provided with a spray end extending out of the feeder housing 3.

The flip assembly 5, the blanking device 6, the casting device 7, and the spraying device 8 are all controlled by a remote control terminal.

Figure 4:
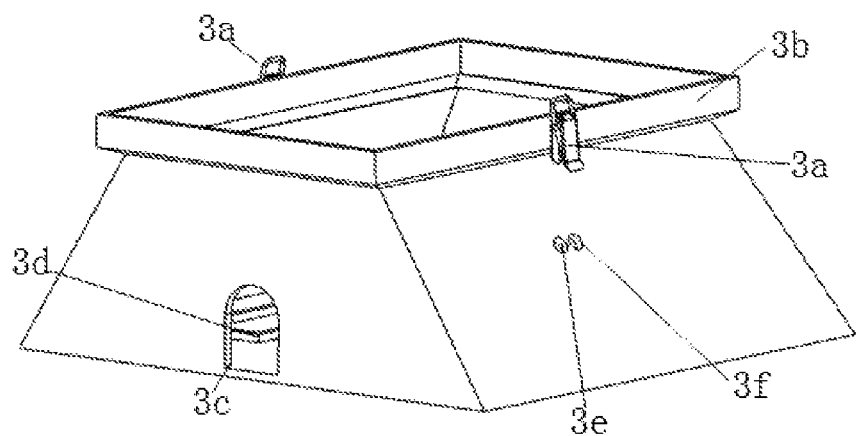
FIG. 4 is a schematic diagram of a structure of the feeder housing.
Figure 9:
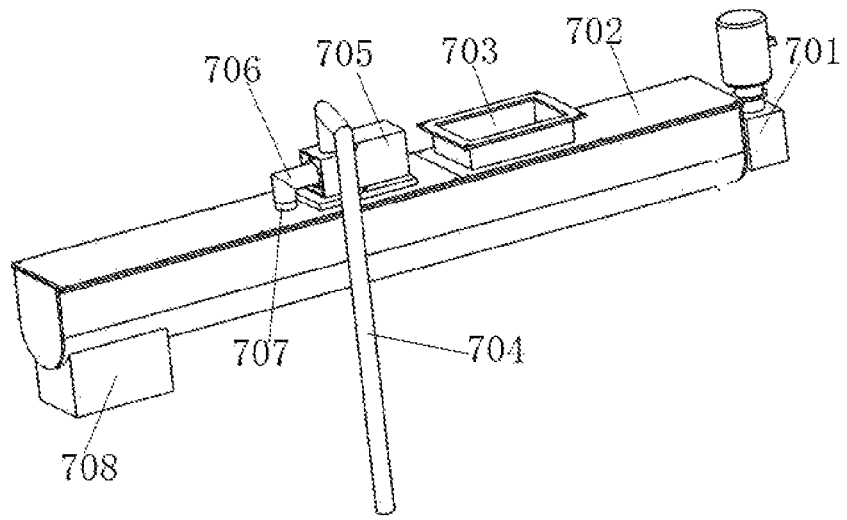
FIG. 9 is a perspective view of a casting device.
Figure 10:
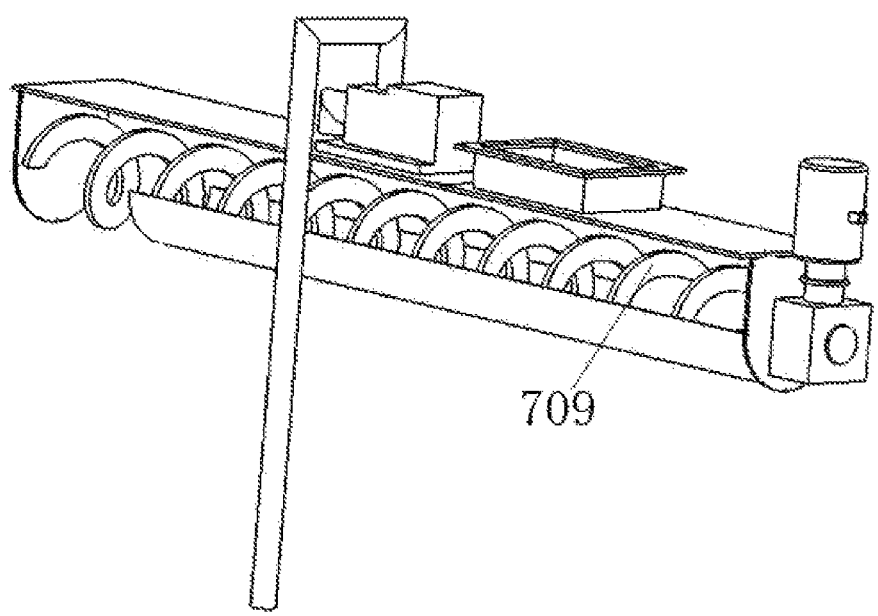
FIG. 10 is a schematic diagram of an internal structure of the casting device.

As shown in FIGS. 9 and 10, the casting device 7 includes a feeding housing base 702, which is arranged in a long box-like structure. One end of the feeding housing base 702 is provided with a feeding motor 701. An upper side of the end of the feeding housing base 702 provided with the feeding motor 701 is provided with an upper inlet 703, which is communicated with an inner cavity of the feeding housing base 702. The upper inlet 703 is communicated with the lower end of the blanking device 6. A lower side of the other end of the feeding housing base 702 is provided with a lower outlet 708 facing downwards and toward the aquaculture water body. The lower outlet 708 is configured as a discharging end of the casting device 7. A linear propulsion mechanism is provided in the feeding housing base 702, and is in transmission connection with an output shaft of the feeding motor 701. The conveying direction of the linear propulsion mechanism is from the upper inlet 703 to the lower outlet 708. As shown in FIGS. 1 and 4, a first hole 3c is provided on the feeder housing 3, so that the feeding housing base 702 can pass through, allowing the lower outlet 708 to be outside the feeder housing 3.

As shown in FIG. 10, the linear propulsion mechanism includes a shaftless spiral blade 709. An end of the shaftless spiral blade 709 is coaxially and fixedly connected to the output shaft of the feeding motor 701. The axis of the shaftless spiral blade 709 is parallel to a length direction of the feeding housing base 702. A bottom plate of the feeding housing base 702 has an arc-shaped plate structure, and the shaftless spiral blade 709 is close to the bottom plate of the feeding housing base 702.

As shown in FIG. 9, in order to humidify the bait to increase the utilization rate of the bait, an upper side of the feeding housing base 702 is provided with a humidifying mechanism, which includes a water pump 705 arranged on the upper side of the feeding housing base 702. A water inlet pipe 704 is connected to an inlet end of the water pump 705, and a water suction section of the water inlet pipe 704 extends vertically into the aquaculture water body. An outlet end of the water pump 705 is connected with a water outlet pipe 706. A water outlet of the water outlet pipe 706 is provided with a water spray nozzle 707 connected to an upper side of the inner cavity of the feeding housing base 702.

Figure 7:
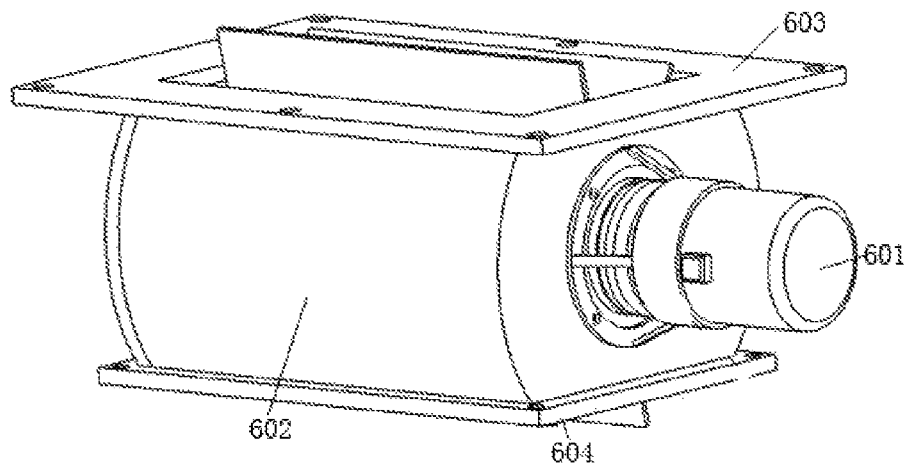
FIG. 7 is a schematic diagram of a blanking device.
Figure 8:
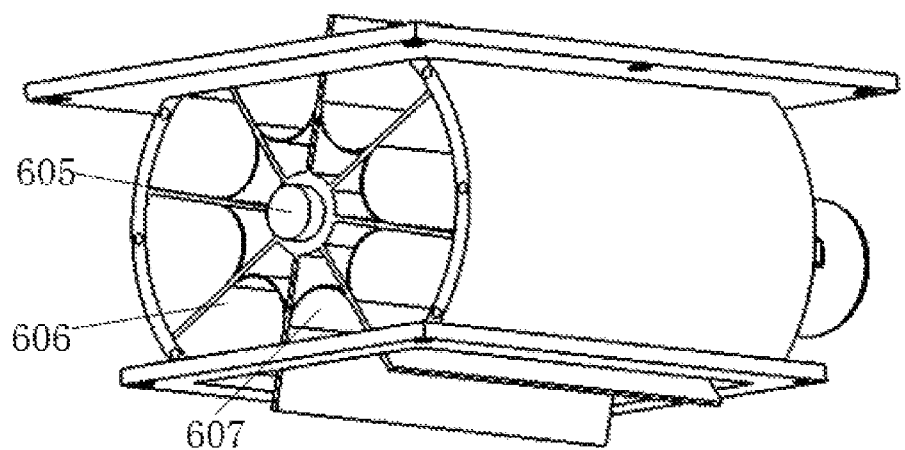
FIG. 8 is a perspective view of the blanking device.

As shown in FIGS. 7 and 8, the blanking device 6 includes a blanking housing base 602, whose upper and lower ends are both open. The upper end of the blanking housing base 602 is provided with an upper connecting plate 603, and the lower end of the blanking housing base 602 is provided with a lower connecting plate 604. The upper connecting plate 603 and the lower connecting plate 604 are connected to a flange structure.

Figure 3:
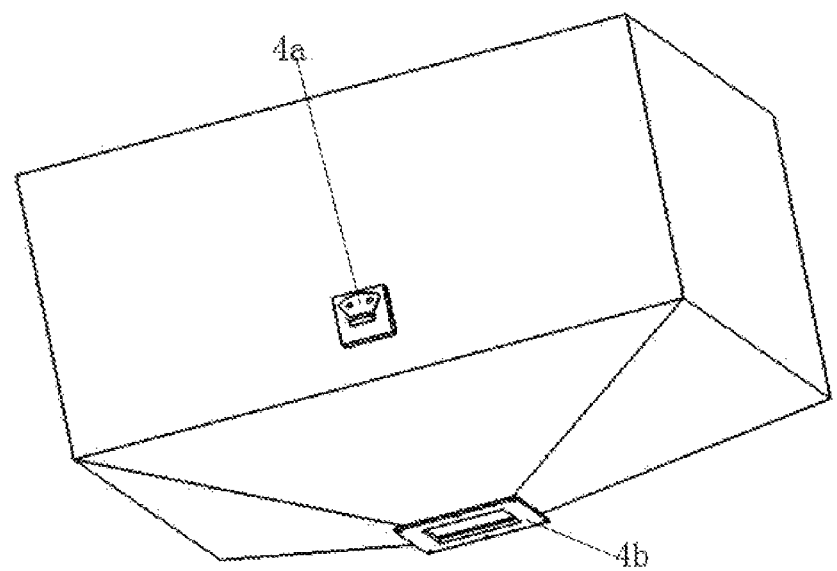
FIG. 3 is a schematic diagram of a structure of a feed box.

As shown in FIG. 3, a bottom of the feed box 4 is configured to be in an inverted quadrangular pyramid structure, and a lowest position of the bottom of the feed box 4 is provided with an opening and a bottom connecting plate 4b surrounding the opening. The upper connecting plate 603 is configured to support and be connected to the bottom connecting plate 4b, and is also configured to connect an upper end of the blanking housing base 602 to the bottom of the feed box 4.

As shown in FIGS. 7 and 9, the lower connecting plate 604 is attached to the upper inlet 703 downward, and is configured to connect the lower end of the blanking housing base 602 to the feeding housing base 702.

As shown in FIGS. 7 and 8, the blanking device 6 also includes a blanking motor 601 fixedly mounted on a side wall of the blanking housing base 602, a blanking rotation shaft 605 and a plurality of blades 606. The blanking rotation shaft 605 is provided in the blanking housing base 602, and is in coaxial butt connection with an output shaft of the blanking motor 601. The blanking motor 601 is a servo motor controlled by the remote control terminal. The blanking rotation shaft 605 is set horizontally, and all blades 606 are evenly distributed around the central axis of the blanking rotation shaft 605. The central axis of the blanking rotation shaft 605 is parallel to a surface of the blades 606.

A cavity 607 is formed between two adjacent blades 606 for quantitative feeding of the bait. A bottom between two adjacent blades 606 is provided with an arc bottom plate, and an axis of the arc bottom plate is parallel to the center axis of the blanking rotation shaft 605. An inner wall of the blanking housing base 602 forms a cylindrical cavity structure that is coaxial with the blanking rotation shaft 605, and edges of the blades 606 are close to the inner wall of the blanking housing base 602, so that the opening of the cavity 607 can be close to the inner wall of the blanking housing base 602 when rotating, so as to avoid leakage of bait during transportation. The blanking rotation shaft 605 is rotatably arranged in the blanking housing base 602, and is driven by the blanking motor 601 to rotate intermittently at an equal angle, so that each of the cavities 607 directly faces the opening at the bottom of the feed box 4. When the opening of the cavity 607 faces downward and communicates with the lower end of the blanking housing base 602, the bait starts to be conveyed downward.

As shown in FIGS. 3 and 4, two opposite sides of a side wall of the feed box 4 are respectively fixedly provided with a hook piece 4a, and an upper end of the feeder housing 3 has an open structure and an edge of the open structure forms a fixing base 3b of the feed box 4. The two opposite positions of an outer side wall of the fixing base 3b are respectively provided with a movable buckle 3a. The fixing base 3b is configured to support the bottom of the feed box 4 and is in positioning fit with the bottom of the feed box 4. The two buckles 3a are respectively in locking fit with the two hook pieces 4a, facilitating the disassembly.

Figure 11:
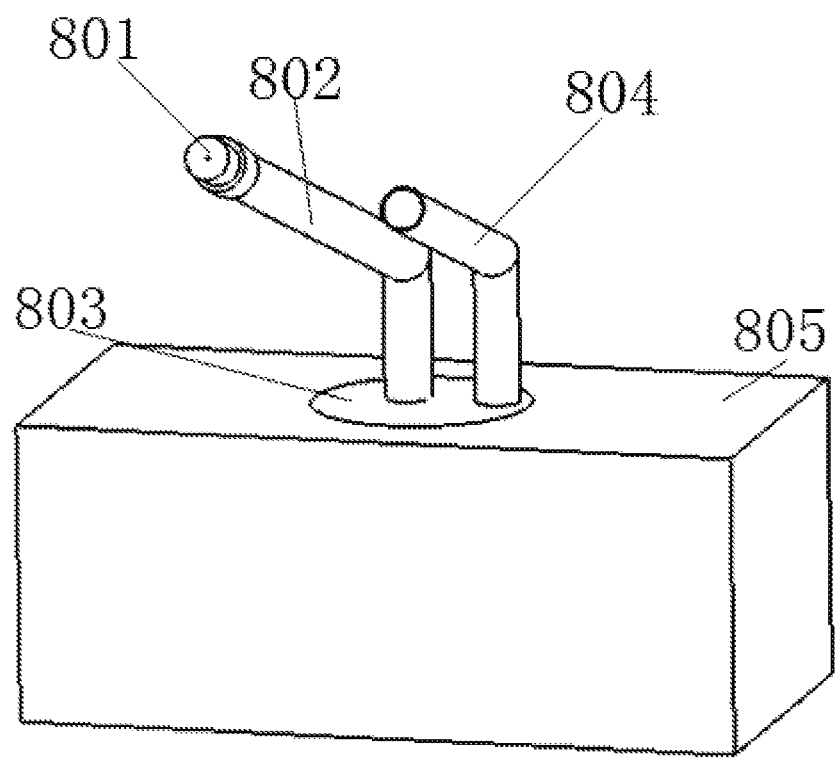
FIG. 11 is a schematic diagram of an external structure of a spraying device.
Figure 12:
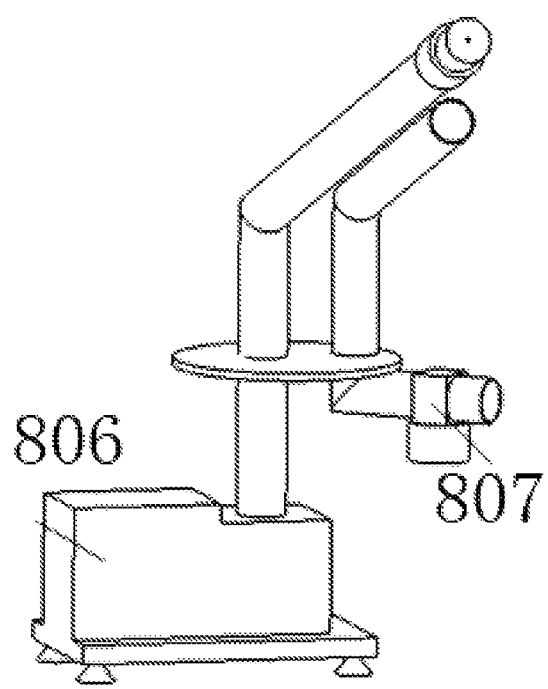
FIG. 12 is a schematic diagram of an internal structure of the spraying device.

As shown in FIGS. 4, 11, and 12, the spraying device 8 includes a drug tank 805 arranged in the feeder housing 3. The drug tank 805 is configured to be filled with an aquaculture drug. A spray pump 806 is provided inside the drug tank 805, and a spray pipe 802 is connected to an output end of the spray pump 806. The spray pipe 802 extends upwards out of the top of the drug tank 805, and passes through the second hole 3e provided on the feeder housing 3. A top of the spray pipe 802 is configured to be inclined upward, and is provided with an atomizing drug-spraying nozzle 801.

The spraying device 8 further includes a drug-feeding pipe 804. The feeder housing 3 is provided with a third hole 3f. A drug tank cover 803 is provided on the top of the drug tank 805, and the drug-feeding pipe 804 successively passes through the third hole 3f and the drug tank cover 803 from the outside to the inside, so that an input end of the drug-feeding pipe 804 is extends out of the feeder housing 3. An output end of the drug-feeding pipe 804 is arranged in the drug tank 805, and the output end of the drug-feeding pipe 804 is provided with a float valve 807 for opening and closing the drug feeding path. When the drug tank 805 is fully loaded, the float valve 807 is in a closed state. The spray pipe 802 penetrates the drug tank cover 803.

Figure 5:
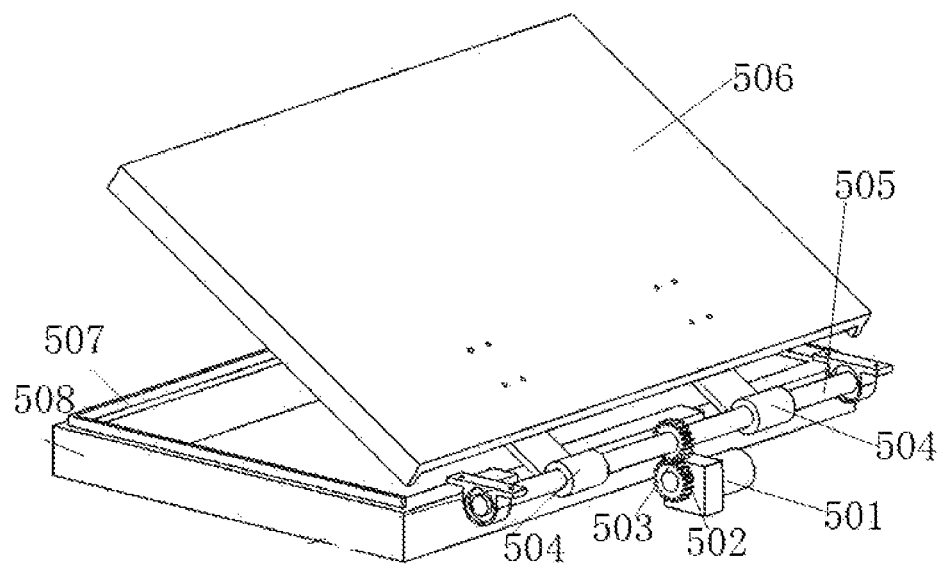
FIG. 5 is a schematic diagram of a structure of a flip device.
Figure 6:
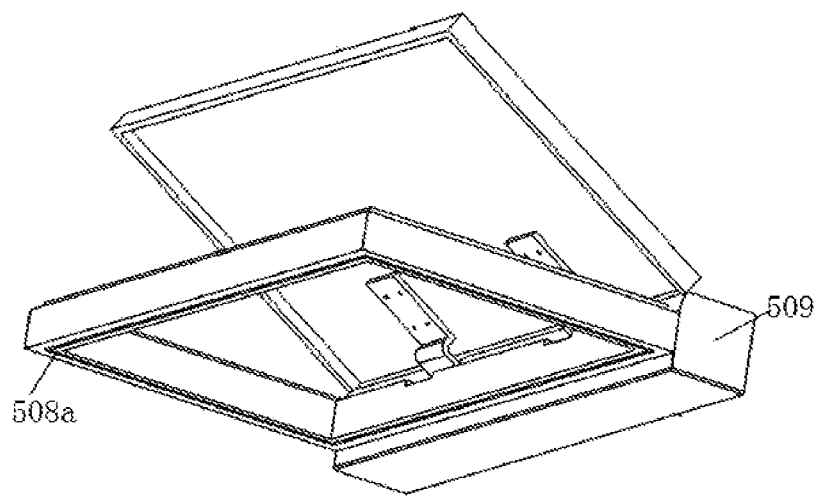
FIG. 6 is a perspective view of the flip device.

As shown in FIGS. 5 and 6, the flip assembly 5 includes a drive housing base 509, a stepping motor 501, a drive gear 502, a driven gear 503, a rotating shaft 505, a feed box cover 506, a connector 504 for connection with the feed box cover 506, a stop bar 507 and a feed box cover base 508. The stepping motor 501, the drive gear 502, the driven gear 503 and the rotating shaft 505 are arranged inside the drive housing base 509. The stepping motor 501, the drive gear 502, the driven gear 503 are in transmission fit in sequence, and the rotating shaft 505 is rotatably arranged in the drive housing base 509 and is capable of rotating up and down. The stepping motor 501 is arranged in the drive housing base 509, and is configured to drive the rotating shaft 505 to rotate to drive the feed box cover 506 to turn over to achieve the purpose of opening and closing. The feed box cover 506 is fixedly connected to the rotating shaft 505 through the connector 504. The stop bar 507 is attached to the edge of the feed box cover base 508 to achieve the sealing effect when closed. The bottom of the feed box cover base 508 is provided with an insertion slot 508a. The upper end of the feed box 4 is inserted into the insertion slot 508a, so that the feed box cover base 508 is installed on the upper end of the feed box 4.

When the above system is used on site, it includes use state and preparation state. In the use state, the quantitative feeding and spraying can be performed simultaneously or separately; in the preparation state, the step of replenishing the bait and the step of replenishing the aquaculture drug can be performed simultaneously or separately.

In the use state, the step of quantitative feeding is performed as follows. A control signal is sent by a remote control terminal to start the blanking motor 601. The blanking rotation shaft 605 is driven by the blanking motor 601 to intermittently rotate at an equal angle to continuously switch one of the cavities 607 directly facing the opening at the bottom of the feed box 4, so that the time that each cavity 607 faces the opening at the bottom of the feed box 4 keeps the same, achieving the even feeding. At the same time, the bait is fed from another cavity 607 facing downward into the upper inlet 703 of the feeding housing base 702, and then the shaftless spiral blade 709 is driven by the feeding motor 701 to transport the bait to the lower outlet 708. Utilizing the characteristics of uniform axial conveyance of the shaftless spiral blade 709, the conveying process of the bait can be stably controlled, and no adhesion phenomenon will occur inside the feeding housing base 702. During the feeding process, the water pump 705 is used to pump the water in the aquaculture water into the water outlet pipe 706, and then the water spray nozzle 707 is used to atomize the water and spray it evenly on the bait to wet the bait.

The drug spraying is performed as follows. The spray pump 806 is started to sprays the aquaculture drug in the drug tank 805 obliquely upwards through the spray pipe 802, and the aquaculture drug is atomized through the atomizing drug-spraying nozzle 801, and sprayed on the aquaculture water body.

The replenishment of the bait is performed as follows. After the hull 1 is docked, the stepping motor 501 is started to drive the feed box cover 506 to rotate upward by transmission to open the feed box 4, and then the bait is fed into the feed box 4 until the predetermined amount is reached. The stepping motor 501 is controlled to operate reversely to allow the feed box cover 506 to cover the feed box 4.

The replenishment of the aquaculture drug is performed as follows. The drug-feeding pipe 804 is connected with a drug source, and the aquaculture drug is fed into the drug tank 805. When the liquid level in the drug tank 805 reaches the preset height, the float valve 807 is automatically closed, and then the drug-feeding pipe 804 is separated from the drug source to complete the replenishment of the aquaculture drug.

The above-mentioned propeller 1a, stepping motor 501, blanking motor 601, feeding motor 701, water pump 705, and spray pump 806 are all controlled by a remote control terminal (such as a remote control), or a remote control signal receiving and processing device is installed on the hull 1 or other locations for unified control, finally realizing the unmanned operation of the entire feeding and spraying process.

Described above are merely preferred embodiments of the disclosure, which are not intended to limit the disclosure. It should be understood that any replacements, changes and modifications made by those skilled in the art without departing from the scope of the disclosure should fall within the scope of the disclosure defined by the appended claims.

What is claimed is:

1. A mobile quantitative feeding-spraying integrated device for aquaculture, comprising:
   at least one hull equipped with a propeller;
   a feeder;
   a feeder housing; and
   a spraying device;
   wherein the feeder housing is fixedly arranged on the at least one hull;
   the feeder comprises a feed box, a flip assembly, a blanking device and a casting device;
   the feed box is arranged above the feeder housing, and is configured for holding a bait;
   the flip assembly is provided at an upper end of the feed box, and is configured to be automatically opened and closed;
   the blanking device is configured to quantitatively control a blanking amount of the bait, and is provided in the feeder housing; an upper end of the blanking device is a feeding end, which is configured to support and communicate with a lower end of the feed box; and a lower end of the blanking device is a discharging end;
   the casting device is configured to cast the bait; an upper side of the casting device is communicated with the lower end of the blanking device, and a lower side of the casting device is provided with a discharging port toward an aquaculture water body;
   the spraying device is arranged in the feeder housing, and is provided with a spray end extending out of the feeder housing;
   the flip assembly, the blanking device, the casting device and the spraying device are controlled by a remote control terminal;
   the casting device comprises a feeding housing base; the feeding housing base has a long box-like structure, and one end of the feeding housing base is provided with a feeding motor; an upper side of the end of the feeding housing base provided with the feeding motor is provided with an upper inlet; the upper inlet is communicated with an inner cavity of the feeding housing base; the upper inlet is communicated with the lower end of the blanking device; a lower side of the other end of the feeding housing base is provided with a lower outlet facing downwards and toward the aquaculture water body; the lower outlet is configured as a discharging end of the casting device; a linear propulsion mechanism is provided in the feeding housing base, and the linear propulsion mechanism is in transmission connection with an output shaft of the feeding motor; and a conveying direction of the linear propulsion mechanism is from the upper inlet to the lower outlet;
   an upper side of the feeding housing base is provided with a humidifying mechanism; the humidifying mechanism comprises a water pump arranged on the upper side of the feeding housing base; an inlet end of the water pump is connected to a water inlet pipe; a water suction section of the water inlet pipe extends vertically into the aquaculture water body; an outlet end of the water pump is connected with a water outlet pipe; a water outlet of the water outlet pipe is provided with a first spray nozzle connected to an upper side of the inner cavity of the feeding housing base; and
   the linear propulsion mechanism comprises a shaftless spiral blade; an end of the shaftless spiral blade is coaxially and fixedly connected to the output shaft of the feeding motor; an axis of the shaftless spiral blade is parallel to a length direction of the feeding housing base; a bottom plate of the feeding housing base has an arc-shaped plate structure; and the shaftless spiral blade is close to the bottom plate of the feeding housing base.

2. The mobile quantitative feeding-spraying integrated device of claim 1, wherein the spraying device comprises a drug tank arranged in the feeder housing; the drug tank is configured to be filled with an aquaculture drug; a spray pump is provided inside the drug tank; a spray pipe is connected to an output end of the spray pump; the spray pipe extends upwards out of a top of the drug tank, and passes through a first hole provided on the feeder housing; a top of the spray pipe is configured to be inclined upward; and the top of the spray pipe is provided with a second spray nozzle for spraying the aquaculture drug.

3. The mobile quantitative feeding-spraying integrated device of claim 2, wherein the spraying device further comprises a drug-feeding pipe; the feeder housing is provided with a second hole; a cover is provided on the top of the drug tank; the drug-feeding pipe successively passes through the second hole and the cover from outside to inside, such that an input end of the drug-feeding pipe extends out of the feeder housing; an output end of the drug-feeding pipe is arranged in the drug tank; the output end of the drug-feeding pipe is provided with a float valve for opening and closing a drug feeding path; when the drug tank is fully loaded, the float valve is in a closed state; and the spray pipe penetrates the cover of the drug tank.

4. The mobile quantitative feeding-spraying integrated device of claim 1, wherein the blanking device comprises a blanking housing base whose upper and lower ends are both open; the upper end of the blanking housing base is provided with an upper connecting plate, and the lower end of the blanking housing base is provided with a lower connecting plate; the upper connecting plate and the lower connecting plate are connected to a flange structure;
   a bottom of the feed box is configured to be in an inverted quadrangular pyramid structure; a lowest position of the bottom of the feed box is provide with an opening and a bottom connecting plate surrounding the opening; the upper connecting plate is configured to support and be connected to the bottom connecting plate, and is also configured to connect an upper end of the blanking housing base to the bottom of the feed box;
   the lower connecting plate is close to the upper inlet downward, and is configured to connect a lower end of the blanking housing base to the feeding housing base;
   the blanking device further comprises a blanking motor, a blanking rotation shaft and a plurality of blades; the blanking motor fixedly mounted on a side wall of the blanking housing base; the blanking rotation shaft is provided in the blanking housing base, and is in coaxial butt connection with an output shaft of the blanking motor; the blanking motor is a servo motor controlled by the remote control terminal; the blanking rotation shaft is set horizontally; the plurality of blades are evenly distributed around a central axis of the blanking rotation shaft; and the central axis of the blanking rotation shaft is parallel to a surface of the plurality of blades; and a cavity is formed between two adjacent blades for quantitative feeding of the bait; a bottom between two adjacent blades is provided with an arc bottom plate, and an axis of the arc bottom plate is parallel to the center axis of the blanking rotation shaft; the blanking rotation shaft is rotatably arranged in the blanking housing base, and is driven by the blanking motor to rotate intermittently at an equal angle, so that each of cavities for quantitative feeding of the bait directly faces the opening at the bottom of the feed box.

5. The mobile quantitative feeding-spraying integrated device of claim 4, wherein two opposite sides of a side wall of the feed box are respectively fixedly provided with a hook piece; an upper end of the feeder housing has an open structure, and an edge of the open structure forms a fixing base of the feed box; two opposite positions of an outer side wall of the fixing base are respectively provided with a movable buckle; the fixing base is configured to support the bottom of the feed box, and is in positioning fit with the bottom of the feed box; and the movable buckle is in locking fit with the hook piece.

6. The mobile quantitative feeding-spraying integrated device of claim 1, wherein the flip assembly comprises a stepping motor, a rotating shaft, a feed box cover, and a drive housing base; the feed box cover is configured to be rotatably connected to the upper end of the feed box through a rotating shaft, and to open and close the upper end of the feed box; the stepping motor is provided in the drive housing base; and an output end of the stepping motor is in transmission connection with the rotating shaft, and is configured to drive the rotating shaft to rotate.

7. A mobile quantitative feeding and spraying integrated method, comprising:
quantitatively feeding a bait and spraying an aquaculture drug simultaneously or separately; and
replenishing the bait and the aquaculture drug simultaneously or separately;

wherein the bait is quantitatively fed through steps of: sending, by a remote control terminal, a control signal to start a blanking motor; driving, by the blanking motor, a blanking rotation shaft to intermittently to intermittently rotate with respect to a central axis of the blanking rotation shaft to continuously switch one of a plurality of cavities for quantitative feeding of the bait that directly faces an opening at a bottom of a feed box; at the same time, feeding the bait from one of the plurality of cavities facing downward into an upper inlet of a feeding housing base; and driving, by a feeding motor, a shaftless spiral blade to convey the bait to a lower outlet; wherein during a feeding process, water in an aquaculture water body is pumped by a water pump into a water outlet pipe, and then atomized through a first spray nozzle and sprayed evenly onto the bait through the first spray nozzle to wet the bait;

the aquaculture drug is sprayed through steps of: starting a spray pump to spray the aquaculture drug in a drug tank obliquely upwards through a spray pipe; and atomizing the aquaculture drug through a second spray nozzle followed by spraying on the aquaculture water body;

the step of replenishing the bait comprises: starting a stepping motor to drive a feed box cover to rotate upward by transmission to open the feed box; feeding the bait into the feed box until a predetermined amount is reached; and controlling the stepping motor to operate reversely to allow the feed box cover to cover the feed box; and the step of replenishing the aquaculture drug comprises: connecting a drug-feeding pipe with a drug source, and feeding the aquaculture drug into the drug tank; when a liquid level in the drug tank reaches a preset height, allowing a float valve arranged at an output end of the drug-feeding pipe to be automatically closed, and separating the drug-feeding pipe from the drug source to complete replenishment of the aquaculture drug.

\* \* \* \* \*